(12) United States Patent
Khan et al.

(10) Patent No.: US 7,376,731 B2
(45) Date of Patent: May 20, 2008

(54) SYSTEM AND METHOD FOR PROVIDING STATISTICS GATHERING WITHIN A PACKET NETWORK

(75) Inventors: Mohiuddin Mohammed Khan, Lowell, MA (US); Patrick John MeLampy, Pepperell, MA (US); Pietro Botticelli, Medford, MA (US); Ephraim Webster Dobbins, Windham, NH (US); Robert Flagg Penfield, Concord, MA (US)

(73) Assignee: Acme Packet, Inc., Burlington, MA (US)

( * ) Notice: Subject to any disclaimer, the term of this patent is extended or adjusted under 35 U.S.C. 154(b) by 907 days.

(21) Appl. No.: 10/059,919

(22) Filed: Jan. 29, 2002

(65) Prior Publication Data

US 2003/0145077 A1 Jul. 31, 2003

(51) Int. Cl.
*G06F 15/173* (2006.01)
(52) U.S. Cl. ............... 709/224; 709/224; 370/216; 370/230; 370/392; 370/401
(58) Field of Classification Search ........... 709/224; 370/253, 216, 392, 401, 230–234
See application file for complete search history.

(56) References Cited

U.S. PATENT DOCUMENTS

| | | | |
|---|---|---|---|
| 4,833,673 A | | 5/1989 | Chao et al. |
| 5,535,199 A | * | 7/1996 | Amri et al. ............ 370/392 |
| 5,768,527 A | * | 6/1998 | Zhu et al. ............. 709/231 |
| 6,230,203 B1 | | 5/2001 | Koperda et al. ....... 709/229 |
| 6,292,465 B1 | | 9/2001 | Vaid et al. ............. 370/230 |
| 6,360,271 B1 | * | 3/2002 | Schuster et al. ....... 709/231 |

(Continued)

FOREIGN PATENT DOCUMENTS

EP 1158816 A2 11/2001

(Continued)

OTHER PUBLICATIONS

Schulzrinne et al., "RTP: A Transport Protocol for Real-Time Applications," Network Working Group, Jan. 1996, pp. 1-66.

(Continued)

*Primary Examiner*—Bunjob Jaroenchonwanit
*Assistant Examiner*—Duyen Doan
(74) *Attorney, Agent, or Firm*—Thomas, Kayden, Horstemeyer & Risley LLP

(57) ABSTRACT

A system and method for providing statistics gathering within a packet network is disclosed. The system comprises a network processor, a traffic manager, a host processor, and a field programmable gate array. The network processor adds a header to received multimedia packets and the traffic manager measures and enforces multimedia flow rates. The host processor performs multimedia flow quality measurement services on a per flow basis, wherein the multimedia flow quality measurement services comprise maintaining current statistics for multimedia flows within the network processor including aggregate and minimum/maximum statistics for the multimedia flow. The field programmable gate array (FPGA) copies a received multimedia packet or a portion of the received multimedia packet, wherein the copy is utilized by the FPGA to perform statistics gathering via use of a latency engine, a lost packet calculation engine, a real-time transport control protocol packet jitter engine and a real-time transport protocol packet jitter engine.

15 Claims, 5 Drawing Sheets

U.S. PATENT DOCUMENTS

| | | | |
|---|---|---|---|
| 6,490,254 B1 * | 12/2002 | Larsson et al. | 370/252 |
| 6,556,567 B1 | 4/2003 | Murakami et al. | |
| 6,678,250 B1 * | 1/2004 | Grabelsky et al. | 370/241 |
| 6,741,569 B1 * | 5/2004 | Clark | 370/252 |
| 6,847,613 B2 * | 1/2005 | Mimura et al. | 370/235 |
| 6,868,094 B1 * | 3/2005 | Bordonaro et al. | 370/516 |
| 7,006,440 B2 * | 2/2006 | Agrawal et al. | 370/235 |
| 2003/0016627 A1 | 1/2003 | McLampy et al. | |

FOREIGN PATENT DOCUMENTS

WO     WO1998020647     5/1998

OTHER PUBLICATIONS

Swale et al., "Requirements for the MIDCOM Architecture and Control Language," MIDCOM Working Group, Internet Draft, Feb. 2001, pp. 1-24.
Srisuresh et al., "Middlebox Communication Architecture and Framework," Network Working Group, Internet Draft, Feb. 2001, pp. 1-37.
Martin et al., "SIP Through NAT Enabled Firewall Call Flows," Midcom Working Group, Internet Draft, Feb. 2001, pp. 1-63.
Rosenberg et al., "Getting SIP through Firewalls and NATs," Internet Engineering Task Force, Internet Draft, Feb. 22, 2000, pp. 1-57.
Eliot Lear, "A Middle Box Achitectural Framework," Network Working Group, Internet Draft, Jan. 31, 2001, pp. 1-12.
Rosenberg et al., "SIP Traversal through Residential and Enterprise NATs and Firewalls," Internet Engineering Task Force, Internet Draft, Mar. 2, 2001, pp. 1-41.
Carpenter et al., "Middleboxes: Taxonomy and Issues," The Internet Society, Internet Engineering Task Force, Internet Draft, Apr. 2001, pp. 1-24.
B. Biggs, "A SIP Application Level Gateway for Network Address Translation," Internet Draft, Mar. 2000, pp. 1-16.
Kuthan et al., "Middlebox Communication: Framework and Requirements," Internet Engineering Task Force, Internet Draft, Nov. 2000, pp. 1-23.
P. Srisuresh, "Framework for Interfacing with Network Address Translator," NAT Working Group, Internet Draft, Apr. 2000, pp. 1-58.
Mart et al., "Firewall Control Requirements," MidCom Bof, Internet Draft, Nov. 2000, pp. 1-16.
Melinda Shore, "H.323 and Firewalls: Problem Statement and Solution Framework," Internet Draft, Feb. 3, 2000, pp. 1-19.
Thernelius et al., "SIP Firewall Solution," SIP Working Group, Internet Draft, Jul. 2000, pp. 1-32.
N. Freed, "Behavior of and Requirements for Internet Firewalls," Network Working Group, Internet Draft, Oct. 2000, pp. 1-14.
D. Newman, "Benchmarking Terminology for Firewall Performance," Network Working Group, The Internet Society, Aug. 1999, pp. 1-51.
F. Finlayson, "IP Multicast and Firewalls," Network Working Group, The Internet Society, May 1999, pp. 1-23.
S. Bellovin, "Firewall-Friendly FTP," Network Working Group, Feb. 1994, pp. 1-7.
Montenegro et al., "Sun's SKIP Firewall Traversal for Mobile IP," Network Working Group, The Internet Society, Jun. 1998, pp. 1-45.
Gaynor et al., "Firewall Enhancement Protocol (FEP)," Network Working Group, The Internet Society, Apr. 1, 2001, pp. 1-22.
Dr. Andrew Molitor, "A Firewall Solution for Voice Over IP," Aravox Report, Aravox Technologies, pp. 1-2.
"Aravox Firewall Benefits," Aravox Technologies, pp. 1-9.
Dr. Andrew Molitor, "Can Voice Over IP Work Without Dynamic NAT?," Aravox Report, Aravox Technologies, pp. 1-2.
Dr. Andrew Molitor, "Deploying a Dynamic Voice over IP Firewall with IP Telephony Applications," Aravox Report, Aravox Technologies, pp. 1-5.
Dr. Andrew Molitor, "Firewall Control for IP Telephony," Aravox Report, Aravox Technologies, pp. 1-5.
Molitor et al., "High Performance H.323 Firewalling for VoIP Solutions," Aravox Report, Aravox Technologies pp. 1-2.
"What is Unique about IP Telephony?," Aravox Technologies, Spring 2001 IT Expo, pp. 1-16.
Dr. Andrew Molitor, "Securing VoIP Networks with Specific Techniques, Comprehensive Policies and VoIP-Capable Firewalls," Aravox Report, Aravox Technologies, pp. 1-3.
Utz Roedig, "Security Analysis of IP-Telephony Scenarios," Presentation by Darmstadt University of Technology, pp. 1-28.
Fredrik Thernelius, "SIP, NAT, and Firewalls," Master Thesis, Ericsson, May 2000, pp. 1-69.
Steven M. Bellovin, "Distributed Firewalls" ;login: Magazine, Nov. 1999, pp. 37-39 (1-10).
"Firewall ActiveX Control for Microsoft Windows," Distinct Corporation, 1998, pp. 1-45.
Jiri Kuthan, "Firewall Control," Flow Processing Control Protocol, pp. 1-3.
Alan Crosswell, "Advanced Networking Information," Columbia University Academic Information Systems, Mar. 21, 2000, pp. 1-22.
"Cisco Secure PIX Firewall Software v5.2," Cisco Data Sheet, pp. 1-7.
"Cisco Secure PIX 500 Firewalls," Cisco Products & Technologies, 2000, pp. 1-3.
"Cisco Secure PIX Firewall," Internet Product Watch, Apr. 12, 2001, pp. 1-2.
"Media Firewall," www.marconi.com, 2000, pp. 1-4.
"Media Firewall," www.marconi.com, 2001, pp. 1-3.
"ATM Switch Network Modules: LAN, WAN, and Service Interfaces for TNX-210, TNX-1100, ASX-200BX, ASX-1000 and ASX-1200 ATM Switches," www.marconi.com, 2000, pp. 1-12.
"Marconi's Next Generation IP and Multi-Service Switch Router Enables End-to-End Differentiated Services," www.marconi.com, Nov. 6, 2000, pp. 1-3.
"Transforming Communications and Information with Enterprise-Focused Ethernet Solutions," www.marconi.com, pp. 1-6.
"Marconi Expands Networking Product Portfolio with Solutions for Emerging Enterprise Needs," www.marconi.com, Jul. 24, 2000, pp. 1-2.
"Marconi to Showcase 'Smart and Fast' Switch/Router at CeBIT," www.marconi.com, Jan. 22, 2001, pp. 1-2.
"Marconi Demonstrates Converged Distance-Learning Solutions at Educause 2000," www.marconi.com, Oct. 10, 2000, pp. 1-2.
"Firewall Security," www.marconi.com, Oct. 30, 2000, pp. 1-2.
"SA-400, IP/ATM Firewalling for ATM Networks," www.marconi.com, 2000, pp. 1-4.
"NSX-9500, Routing, LANE, and Firewalling Services for ATM Backbone Networks," www.marconi.com, 2000, pp. 1-4.
"The New Public Network: Scalable, Flexible, PSTN Features, IN Features, Signalling Gateway," www.marconi.com, 1999, pp. 1-4.
"Sphericall Voice Internetworking Multiplexer (VIM) Product Overview," www.marconi.com, 2001, p. 1.
"ServiceOn Accountant 2.0: Per-call Usage Based Billing for Differentiated Services," www.marconi.com, Dec. 12, 2000, pp. 1-2.
"Marconi Extends Optical Networking; Introduces Advanced Multiservice Platform," www.marconi.com, Jun. 6, 2000, pp. 1-2.
"ATM Switched Network Modules Product Overview," www.marconi.com, 2001, p. 1-4.
"Security is the Key," Marconi Interface, May 2000, p. 30.
"Firewall Switching Agent," www.marconi.com, 2001, pp. 1-4.
"ESX-2400 and ESX-4800 Firewall Accelaration Switches," www.marconi.com, 2001, pp. 1-8.
"ESX-2400 and ESX-4800 Product Overview," www.marconi.com, 2001, pp. 1-3.
"FSA Product Overview," www.marconi.com, 2001, pp. 1-2.
Parthenios, "Hackers Beware," Telephony, Jun. 18, 2001, pp. 1-2.
"Aravox Expands IP Platform to Include VoIP," CommWeb.com, May 30, 2001, p. 1.
"Aravox Expands IP Network Services Platform to Carriers and xSP's Deploying VoIP," biz.yahoo.com., May 29, pp. 1-2.
"Aravox Expands IP Network Services Platform to Carriers and Service Providers Deploying VoIP," TMCnet.com, May 29, 2001, pp. 1-2.
"Solutions,": www.aravox.com/solutions, 2001, p. 1.

"The Aravox Network Services Platform Solution for Backbone Carriers," www.aravox.com/backbone, 2001, p. 1.

"The Aravox Network Services Platform Solution for Access Providers," www.aravox.com/access, 2001, p. 1.

"The Aravox Network Services Platform Solution for Enterprises," www.aravox.com/enterprise, 2001, p. 1.

"SIP ALG for Firewall Traversal (Application Level Gateway)," www.microappliances.com, 2000, p. 1.

"SIP Firewall/Outbound Proxy Server (ALG)," www.microappliances.com, 2000. p. 1.

"Microappliances SIP Phone (ActiveX)," www.microappliances.com, 2000, p. 1.

"Convergence Data and Telephony Platform," www.microappliances.com, 2000, p. 1.

Mart et al., "Firewall Control Requirements," MidCom Bof, Internet Draft, Nov. 2000, pp.1-16.

Melinda Shore, "H.323 and Firewalls: Problem Statement and Solution Framework," Internet Draft, Feb. 3, 2000, pp. 1-19.

Thernelius et al., "SIP Firewall Solution," SIP Working Group, Internet Draft, Jul. 2000, pp. 1-32.

N. Freed, "Behavior of and Requirements for Internet Firewall ," Network Working Group, Internet Draft, Oct. 2000, pp. 1-14.

D. Newman, "Benchmarking Terminology for Firewall Performance," Network Working Group, The Internet Society, Aug. 1999, pp. 1-51.

F. Finalyson, "IP Multicast and Firewalls," Network Working Group, The Internet Society, May 1999, pp. 1-23.

S. Bellovin, "Firewall-Friendly FTP," Network Working Group, Feb. 1994, pp. 1-7.

Montenegro et al., "Sun's SKIP Firewall Traversal for Mobile IP," Network Working Group, The Internet Society, Jun. 1998, pp. 1-45.

Gaynor et al., "Firewall Enhancement Protocol (FEP)," Network Working Group, The Internet Society, Apr. 1, 2001, pp. 1-22.

Dr. Andrew Molitor, "A Firewall Solution for Voice Over IP," Aravox Report, Aravox Technologies, pp. 1-2, date unknown.

"Aravox Firewall Benefits," Aravox Technologies, pp. 1-9, date unknown.

Dr. Andrew Molitor, "Can Voice Over IP Work Without Dynamic NAT?," Aravox Report, Aravox Technologies, pp. 1-2, date unknown.

Dr. Andrew Molitor, "Deploying a Dynamic Voice over IP Telephony Applications," Aravox Report, Aravox Technologies, pp. 1-5, date unknown.

Dr. Andrew Molitor, "Firewall Control for IP Telephony," Aravox Report, Aravox Technologies, pp. 1-5, date unknown.

Molitor et al., "High Performance H.323 Firewalling for VoIP Solutions," Aravox Report, Aravox Technologies pp. 1-2, date unknown.

"What is Unique about IP Telephony?," Aravox Technologies, Spring 2001 IT Expo, pp. 1-16.

Dr. Andrew Molitor, "Securing VoIP Networks with Specific Techniques, Comprehensive Policies and VoIP-Capable Firewalls," Aravox Report, Aravox Technologies, pp. 1-3, date unknown.

Utz Roedig, "Security of IP-Telephony Scenarios," Presentation by Darmstadt University of technology, pp. 1-28, date unknown.

Fredrik Thernelius, "SIP, NAT, and Firewalls," Master Thesis, Ericsson, May 2000, pp. 1-69.

Steven M. Bellovin, "Distributed Firewalls" ;login: Magizine, Nov. 1999, pp. 37-39 (1-10).

"Firewall ActiveX Control for Microsoft Windows," Distinct Corporation, 1998, pp. 1-45.

Jiri Kuthan, "Firewall Control," Flow Processing Control Protocol, pp. 1-3, date unknown.

Alan Crosswell, "Advanced Networking Information," Columbia University Academic Information Systems, Mar. 21, 2000. pp. 1-22.

"Cisco Secure PIX Firewall Software v5.2," Cisco Data Sheet, pp. 1-7, date unknown.

"Cisco Secure PIX 500 Firewalls," Cisco Products & Technologies, 2000, pp. 1-3.

"Cisco Secure PIX Firewall," Internet Product Watch, Apr. 12, 2001, pp. 1-2.

"Media Firewall," www.marconi.com, 2000, pp. 1-4.

"Media Firewall," www.marconi.com 2001, pp.1-3, date unknown.

"ATM Switch Network Modules: LAN, WAN, and Service Interfaces for TNX-210, TNX-1100, ASX-200BX, ASX-1000, and ASX-1200 ATM Switches," www.marconi.com, 2000, pp. 1-12.

"Marconi's Next Generation IP and Multi-Service Switch Router Enables End-to-End Differentiated Services," www.marconi.com, Nov. 6, 2000, pp. 1-3.

"Transforming Communications and information with Enterprise-Focused Ethernet Solutions," www.marconi.com, pp. 1-6, date unknown.

"Marconi Expands Networking Product Portfolio with Solutions for Emerging Enterprise Needs," www.marconi.com, Jul. 24, 2000, pp. 1-2.

"Marconi to Showcase 'Smart and Fast' Switch/Router at CeBIT," www.marconi.com, Jan. 22, 2001, pp. 1-2.

* cited by examiner

SYSTEM AND METHOD FOR PROVIDING STATISTICS GATHERING WITHIN A PACKET NETWORK

CROSS-REFERENCE TO RELATED APPLICATIONS

This application incorporates by reference U.S. patent application entitled "System and Method for Determining Flow Quality Statistics for Real-Time Transport Protocol Data Flows," filed on Jul. 23, 2001, and having Ser. No. 09/911,256 ; U.S. Application entitled "System and Method for Providing Rapid Rerouting of Real-Time Multimedia Flows," filed on Jul. 23, 2001, and having Ser. No. 09/911,304; U.S. patent application entitled "System and Method for Providing Encryption for Rerouting of Real-Time Multimedia Flows," filed on Aug. 28, 2001, and having Ser. No. 09/941,229; U.S. patent application entitled "System and Method for Improving Communication Between a Switched Network and a Packet Network," filed on Nov. 2, 2001, and having Ser. No. 10/000,409 and U.S. patent application Ser. No. 10/103,408 entitled "System and Method for Efficiently Determining a Destination for an Internet Protocol Packet," filed on the same date herewith, the disclosures of which are incorporated by reference herein in their entirety.

FIELD OF THE INVENTION

The present invention generally relates to telecommunications and, more particularly, is related to a system and method for providing statistics gathering calculation within a packet network.

BACKGROUND OF THE INVENTION

The public switched telephone network (PSTN) has evolved into an efficient real-time, multimedia communication session tool, wherein users can pick up any one of nearly one billion telephones and dial any one of nearly one billion endpoints. Several developments have enabled this automated network, such as numbering plans, distributed electronic switching and routing, and networked signaling systems.

Similar to the manner in which the PSTN is based on a hierarchy, the Internet is based on an Internet protocol (IP). IP messages, or multimedia packets, are routed or forwarded from one link to the next (i.e., from a source of a data flow to a destination of the data flow). Each multimedia packet comprises an IP address, which, in Internet protocol version 4 (IPv4), for example, has 32 bits. Each IP address also has a certain number of bits dedicated to a network portion, and a certain number of bits dedicated to a host portion. It should be noted that multimedia comprises at least, text, graphics, video, animation, voice, data, and/or discrete media.

More specifically, multimedia packets comprise a header portion and an IP packet data portion. The header portion of the multimedia packet, at a minimum, comprises at least a source portion and a destination portion, wherein the source portion identifies a source address from which the packet arrived, and the destination portion identifies a destination address to which the packet is addressed. The IP packet data portion of the multimedia packet entails the remaining portion of the multimedia packet, which comprises data that is being transmitted to a destination device located at the destination address.

As multimedia packets are transmitted, it is desirable to determine a best route to a destination device. It is also desirable to determine the best route to the destination device prior to transmission of the multimedia packets. Factors that may assist in determining a best route to a destination device include, among others, jitter, latency and/or a number of lost packets associated with devices located within a route to the destination address. If jitter, latency and/or lost packets, among other elements, are known for devices within different available routes to the destination device, a route having favorable jitter, latency and/or lost packet measurements may be selected. Therefore, the gathering these and other multimedia transmission statistics is beneficial.

SUMMARY OF THE INVENTION

In light of the foregoing, the preferred embodiment of the present invention generally relates to a system for providing statistics gathering within a packet network.

Generally, with reference to the structure of the statistics generation system, the system utilizes a network processor, a traffic manager, a host processor, and a field programmable gate array. The network processor adds a header to received multimedia packets and the traffic manager measures and enforces multimedia flow rates. The host processor performs multimedia flow quality measurement services on a per flow basis, wherein the multimedia flow quality measurement services comprise maintaining current statistics for multimedia flows within the network processor including aggregate and minimum/maximum statistics for the multimedia flow. The field programmable gate array (FPGA) copies a received multimedia packet or a portion of the received multimedia packet, wherein the copy is utilized by the FPGA to perform statistics gathering via use of a latency engine, a lost packet calculation engine, a real-time transport control protocol packet jitter engine and a real-time transport protocol packet jitter engine.

The present invention can also be viewed as providing a method for providing statistics gathering within a packet network. In this regard, the method can be broadly summarized by the following steps: providing a received multimedia packet with an arrival time; determining information from the received multimedia packet to be transmitted to a series of calculation engines, wherein the calculation engines perform statistics gathering; transmitting the determined information to the calculation engines; and gathering statistics based upon the received multimedia packet.

Other systems and methods of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like referenced numerals designate corresponding parts throughout the several views.

DETAILED DESCRIPTION OF THE PREFERRED EMBODIMENT

In the transmission of multimedia packets from a first endpoint to a second endpoint, the processing of multiple multimedia transmission routes and the selection of a best multimedia transmission route is desirable. An example of a system that provides for multimedia transmission route processing and selection is provided by the co-pending U.S. patent application entitled, "System and Method for Assisting in Controlling Real-time Transport Protocol Flow Through Multiple Networks via Multi-media Flow Routing," by MeLampy et. al., filed on Jul. 23, 2001, and having Ser. No. 09/911,256 (hereinafter, "the '256 patent application"), the disclosure of which is hereby incorporated by reference in its entirety.

The '256 patent application discloses use of a session router for selecting multiple multimedia transmission routes and processing the routes in order, and for selecting from a set of session initiation protocol (SIP) agent(s) that are otherwise equal, via use of various distribution strategies. The selection and processing of multiple multimedia routes, in addition to selecting from a set of SIP agents, results in managing the path of the resulting real-time transport protocol (RTP) packet flow. The U.S. patent application entitled "System and Method for Providing Rapid Rerouting of Real Time Multi-media Flows," by MeLampy et. al., filed on Jul. 23, 2001, having Ser. No. 09/911,304 (hereinafter "the '304 patent application"), the disclosure of which in hereby incorporated by reference in its entirety, discloses media routers for guiding the resulting RTP flows selected and processed by the session router through certain thresholds. Therefore, the combination of the abovementioned '256 and '304 patent applications creates a high-quality border between various IP networks. Without the use of session routers and media routers, data packets would flow whichever way networks would allow.

Figure 1:
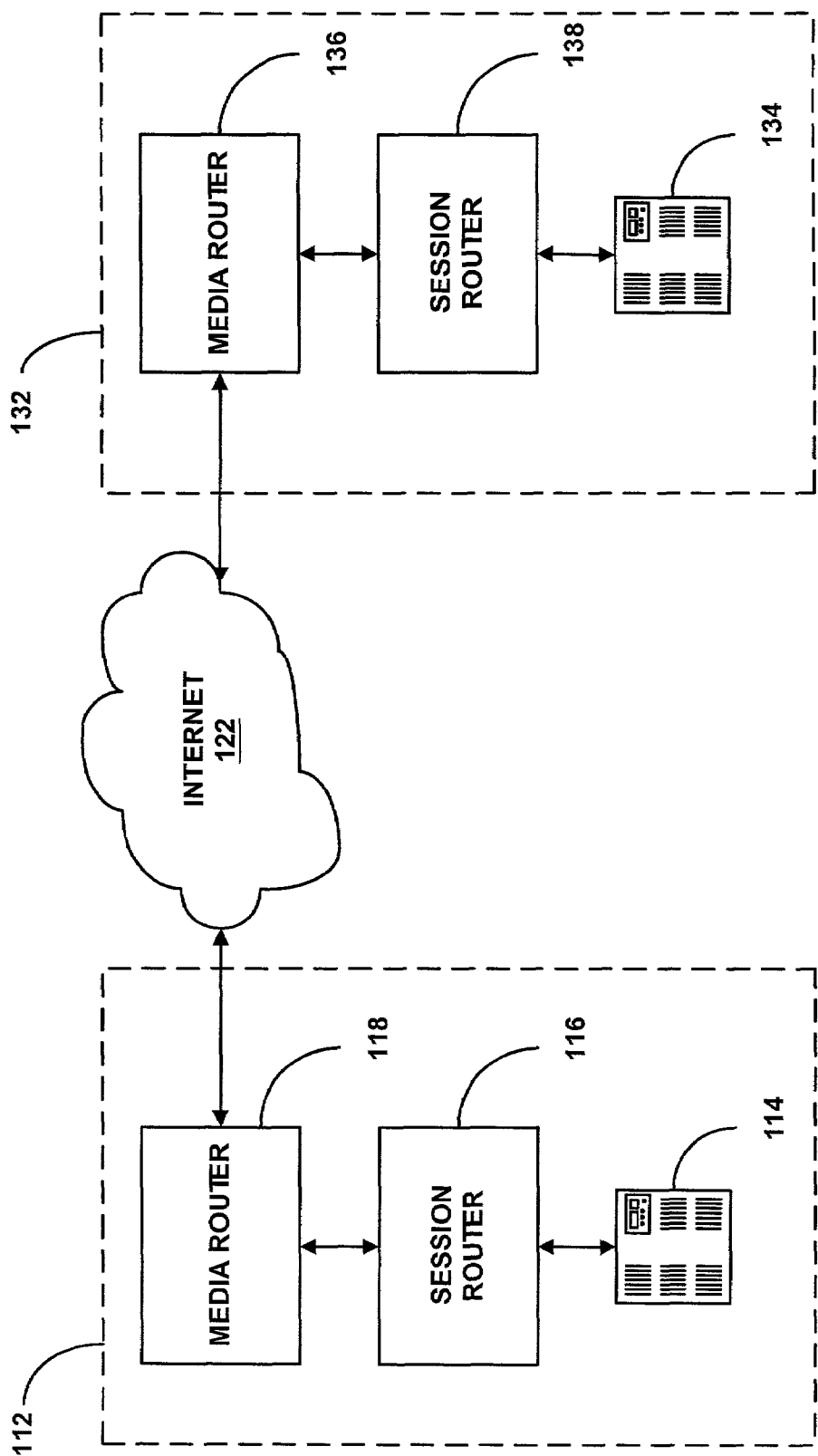
FIG. 1 is a block diagram that illustrates a communication network in which the present statistics gathering system may be provided.

The introduction of media routers into the real-time multimedia flow forces multimedia packets through a known interface. Referring now to the drawings, wherein like reference numerals designate corresponding parts throughout the drawings, FIG. 1 is a block diagram that illustrates a communication network 102, in which the use of session routers and media routers is demonstrated, and wherein the present statistics gathering system may be provided. As shown by FIG. 1, a first carrier network 112 comprises a first SIP phone 114, such as, for example, those produced by Pingtel of Massachusetts, U.S.A., a first session router 116, and a first media router 118. A second carrier network 132, which is connected to the first carrier network 112 via an Internet 122, comprises a second SIP phone 134, a second session router 138, and a second media router 136.

It should be noted that any device, SIP or non-SIP, may be included within the first and second carrier networks 112, 132 that requires communication between the networks 112, 132. Other RTP data sources include, but are not limited to, integrated access devices (IAD), VoIP gateways (Cisco AS5300, Sonus GSX), and multimedia sources (PCs, IP-PBXs). Further, communication between the first carrier network 112 and the second carrier network 132 may instead be provided via a wide area network (WAN) or local area network (LAN). Also, the Internet 122, may instead be a data network domain since the media routers 118, 136 are utilized between two domains within the Internet 122.

Alternatively, a router, such as, but not limited to, a border router, may be located between the first and second media routers 118, 136 to assist in communication between the first and second carrier networks 112, 132. Communication from the first SIP phone 114 to the second SIP phone 134 may instead be provided by the first and second media routers 118, 136. It should be noted, however, that an additional router, such as a border router, is not necessary in providing communication between the first and second carrier networks 112, 132. The first and second session routers 116, 138 provide SIP and telephony routing over IP (TRIP) protocol support as is described in detail by the presently pending application titled "System and Method for Assisting in Controlling Real-Time Transport Protocol Flow Through Multiple Networks," by MeLampy et. al., having Ser. No. 09/844,204, and being filed on Apr. 27, 2001, the disclosure of which is incorporated herein by reference in its entirety.

Figure 2:
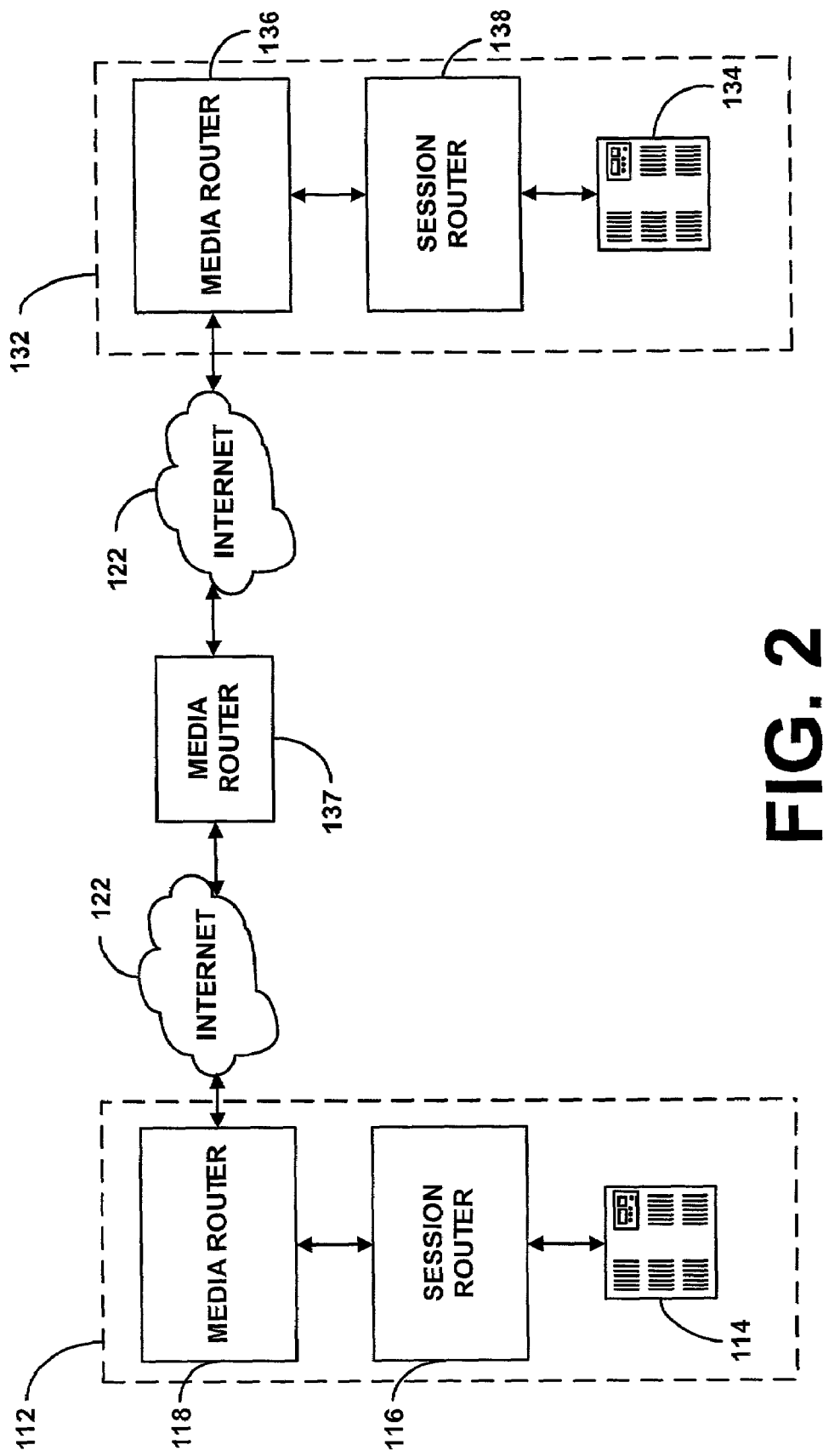
FIG. 2 is a block diagram that illustrates use of an additional media router within the communication network of FIG. 1.

Additional media routers may be provided between the first media router 118 and the second media router 136. FIG. 2 is a block diagram that illustrates use of an additional media router within the communication system of FIG. 1, as may be utilized in accordance with an alternate embodiment of the invention. As such, the first media router 118, located within the first carrier network 112, communicates with a third media router 137, via the Internet 122. The third media router 137, in turn, communicates with the second media router 136, within the second carrier network 132, via the Internet 122. To reiterate, communication from a first media router may be to a second media router, a session router, a SIP device, and/or a non-SIP device located in a LAN, WAN, or other location.

Figure 3:
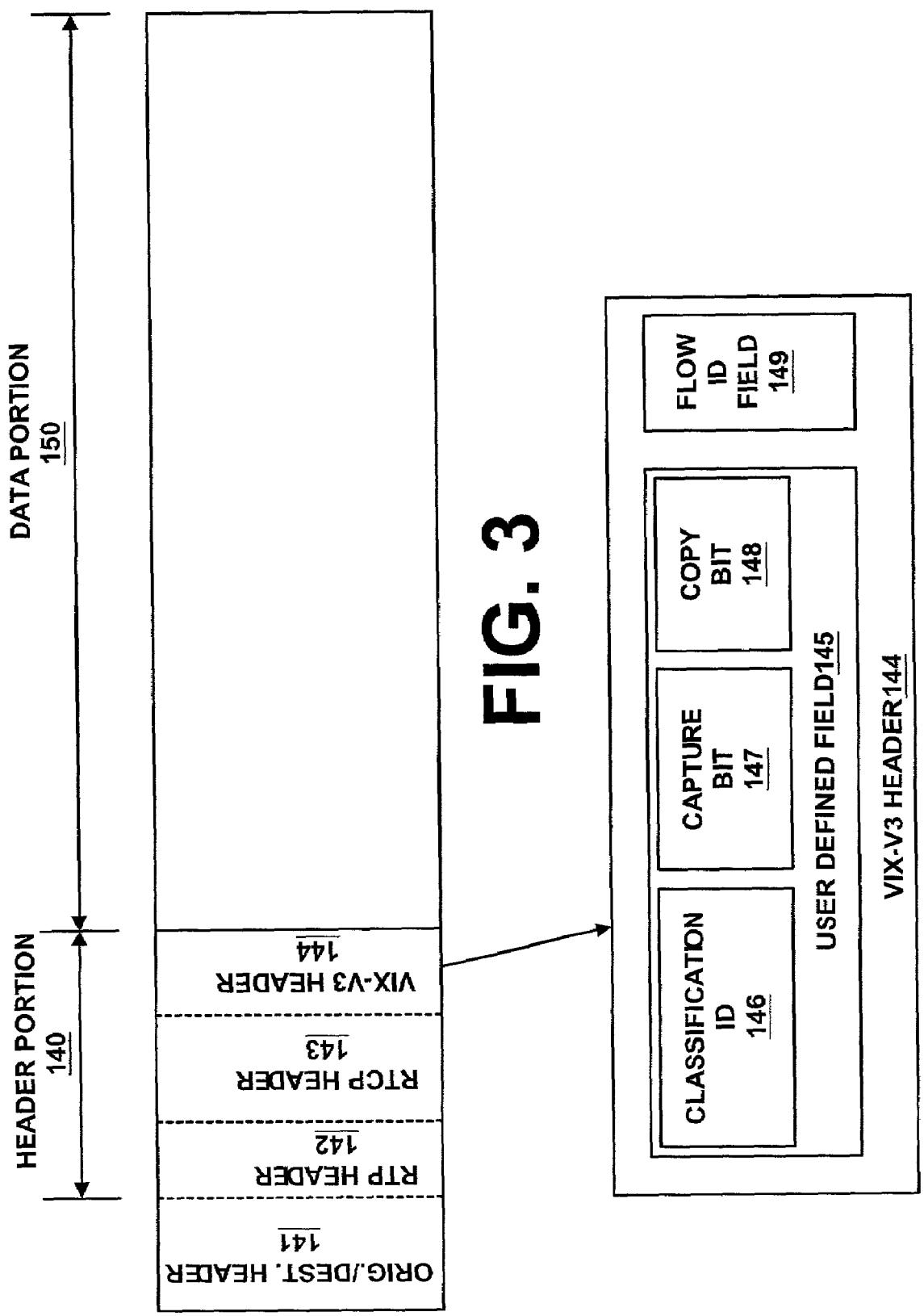
FIG. 3 is a block diagram that further illustrates an example of a multimedia packet that may be received by the media router of FIGS. 1 and 2.

FIG. 3 is a block diagram that further illustrates an example of a multimedia packet that may be received by a media router (hereafter 118). Specifically, as is shown by FIG. 3, the multimedia packet comprises a header portion 140 and a data portion 150, wherein the data portion comprises information that is to be transmitted to a destination. The header portion 140 of the multimedia packet comprises an origin/destination header 141, an RTP header 142, a real-time transport control protocol (RTCP) header 143, and a Vix-V3 header 144. It should be noted that various aspects of the header, including size and format, may differ in accordance with the protocol utilized by the communication network 102 (FIG. 1). The origin/destination header 141 of the header portion 140 has therein a source address, destination address, source port and/or destination port for the multimedia packet, wherein the addresses and ports are utilized to specify the origins and destinations of the multimedia packet.

The Vix-V3 header 144 further comprises a user-defined field 145 and a flow identification field 149. The user-defined field 145 further comprises a classification ID 146, a capture bit 147, and a copy field 148. The classification ID 146 specifies whether the present multimedia packet is an RTP packet or an RTCP packet. The capture bit 147 is utilized by an FPGA (discussed below) to determine whether a capture engine (discussed below), located within the FPGA, should copy the multimedia packet for use within the media router (hereafter 118). The copy field 148 is utilized by a traffic manager to determine whether to provide a copy of the data portion of the RTP multimedia packet to a network processor, or to both the network processor and the FPGA. In addition, a copy bit located within the copy field 148 is utilized by the FPGA to specify whether the entire multimedia packet or a portion of the multimedia packet is to be copied by the capture engine.

The flow identification (ID) field 149 is used by the media router 118 to identify all multimedia packets within a specific multimedia packet flow. It should be noted that each of the above portions of a multimedia packet is further discussed in detail below.

Figure 4:
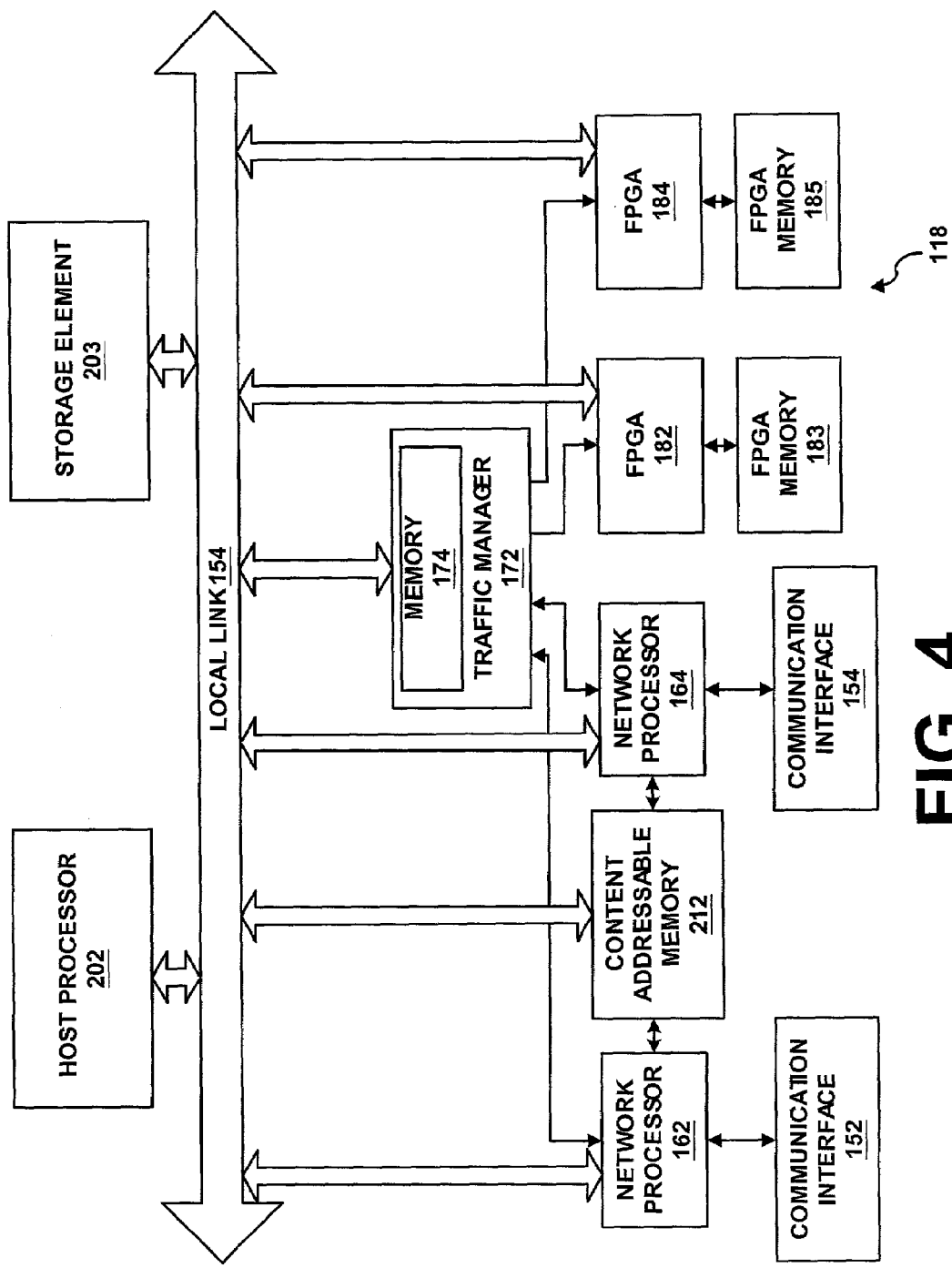
FIG. 4 is a block diagram further illustrating a media router, as provided by FIG. 1 and FIG. 2.

FIG. 4 is a block diagram further illustrating a media router (hereinafter 118) shown by FIG. 1 and FIG. 2. It should be noted that FIG. 4 provides one embodiment of the media router 118, while other embodiments may also be provided. As is shown by FIG. 4, a first communication interface 152 and a second communication interface 154 are located within the media router 118 for providing means of external communication with the media router 118. Of course, additional, or fewer, communication interfaces may be located within the media router 118.

Input devices (not shown) may be connected to the first and/or second communication interface 152, 154. Examples of input devices may include, but are not limited to, a keyboard or a mouse. Output devices (not shown) may also be connected to the first and/or second communication interface 152, 154. Examples of output devices may include, but are not limited to, a computer monitor or a printer.

Network Processors

Two network processors are located within the media router 118. Specifically, a first network processor 162 and a second network processor 164 are provided within the media router 118, each of which is connected to a communication interface 152, 154. It should be noted that additional or fewer network processors may be located within the media router 118. The network processors 162, 164 perform multimedia packet header inspection. In addition, the network processors 162, 164 support multi-protocol label switching (MPLS) label extraction and insertion, wherein the media router 118 is capable of removing and/or inserting an MPLS tag into the IP header of a multimedia packet.

The network processors 162, 164 also provide translation services within the media router 118. The translation services provided by the network processors 162, 164 comprise the capability to translate the source address, destination address, source port, destination port or any combination of these fields within a multimedia packet. In addition, the network processor 162, 164 is capable of inserting or modifying a diffserv codepoint located within the header portion 140 (FIG. 3) of the multimedia packet, that is used to modify priority of multimedia packets prior to packet transmission.

Each network processor 162, 164 comprises an interface, such as, but not limited to, a Vix-V3 interface. The Vix-V3 interface is utilized by the network processor 162, 164 to convert received RTP multimedia packets into multiple fixed length cells, otherwise referred to herein as Vix-V3 fixed length cells. The Vix-V3 fixed length cells are recognizable by both a traffic manager and FPGAs, both of which are discussed in detail below. To convert an RTP multimedia packet to Vix-V3 fixed length cells, the network processor 162, 164 adds the Vix-V3 header 144 (FIG. 3) to the RTP multimedia packet. Portions of the Vix-V3 header, specifically, the user-defined field 145 (FIG. 3) and the flow identification field 149 (FIG. 3), are used by the traffic manager and the FPGAs for reasons discussed below. As an example, the flow identification field 149 (FIG. 3) portion of the Vix-V3 header 144 (FIG. 3) is used by the traffic manager, the FPGAs and the network processors 162, 164 to identify an RTP multimedia packet for storage of packet statistics in accordance with a specific identified RTP multimedia flow.

The network processor 162, 164 may be utilized to set the capture bit 147 (FIG. 3) within the header portion 140 (FIG. 3) of a multimedia packet. As is further explained below, the capture bit 147 (FIG. 3) is utilized by a field programmable gate array (FPGA) to determine whether a capture engine (discussed below), located within the FPGA, should copy the entire multimedia packet or a portion of the packet for use within the media router 118. An example of when only a portion of the multimedia packet may be necessary to copy, is when the only information associated with the multimedia packet that is needed by the FPGA for storage or statistics purposes is the origin or destination of the packet. In addition, after conversion of the RTP multimedia packet to Vix-V3 fixed length cells, the network processor 162, 164 specifies, within the copy field 148 of the Vix-V3 header 144 (FIG. 3), whether to provide a copy of the RTP multimedia packet to the network processor 162, 164, or to both the network processor 162, 164 and the FPGA 182, 184.

Traffic Manager

A traffic manager 172 is located within the media router 118. The traffic manager 172 preferably comprises four input/output (I/O) ports, wherein the two network processors 162, 164 connect to two of the four I/0 ports made available by the traffic manager 172 for communication within the media router 118. The remaining two I/O ports are connected to two FPGAs 182, 184 that are dedicated to procurement and calculation of network statistics. The FPGAs 182, 184 and functionality performed by the FPGAs 182, 184 are further discussed below.

The flow identification field 149 (FIG. 3) of a received multimedia packet is utilized by the traffic manager 172 to determine which I/O port of the traffic manager 172 to utilize for transmission of the received multimedia packet. Preferably, a traffic manager memory 174, which is located within the traffic manager 172, stores potential flow identification field 149 (FIG. 3) values. In association with each flow identification field 149 (FIG. 3) value, the traffic manager memory 174 also has stored therein a destination traffic manager I/O port. Therefore, the traffic manager memory 174 may be searched for a flow identification field 149 (FIG. 3) value associated with a received RTP multimedia packet to determine which I/O port of the traffic manager 172 should be utilized for transmission of the received RTP multimedia packet.

From an inbound perspective, the traffic manager 172 monitors RTP multimedia packet flows and enforces maximum data transmission rates by either dropping RTP multimedia packets or marking them as eligible for discarding if they are outside a bandwidth allocated for the RTP multimedia packet flow. The traffic manager 172 may also be instructed by the session router 116 (FIG. 1) to accept a specific amount of multimedia in accordance with an allocated bandwidth and bit rate. Therefore, if multimedia is received at a higher bit rate than allowed by the session router 116 (FIG. 1), multimedia received at the higher bit rate is not transmitted by the media router 118. It should be noted that the characteristics specified by the session router 116 (FIG. 1) may instead be programmed directly into the media router 118 without using the session router 116 (FIG. 1).

The traffic manager 172 is also used to measure and/or enforce IP session RTP multimedia flow rates, or traffic, the process of which is otherwise referred to herein as traffic measurement. One example of a commercially available traffic manager 134 is an NPX5700 traffic manager that is sold by MMC Networks located in California, USA. Essentially, the traffic manager 172 measures the number of multimedia packets that flow through a communication interface 152, 154.

The traffic manager memory 174 may also be utilized for temporarily storing received RTP multimedia packets. In addition, once a forwarding decision has been made by the media router 118, the traffic manager 172 works in concert with a network processor 162, 164 and an FPGA (described below) to queue the received RTP multimedia packet into its respective IP multimedia packet flow, within a specified priority. Therefore, the traffic manager 172 is capable of specifying a specific order in which received RTP multimedia packets, that have been temporarily stored within the traffic manager memory 174, are to be transmitted from the multimedia router 118 to a destination.

The traffic manager 172 also inspects the copy field 148 (FIG. 3) of a received RTP multimedia packet header portion 140 to determine if the data portion of the received RTP multimedia packet is to be copied and transmitted by the traffic manager 172. As mentioned above with reference to the description of the copy field 148 (FIG. 3), the copy field 148 (FIG. 3) also specifies whether to transmit the copied data portion to the network processor 162, 164, or to both the network processor 162, 164 and the FPGA 182, 184.

Figure 5:
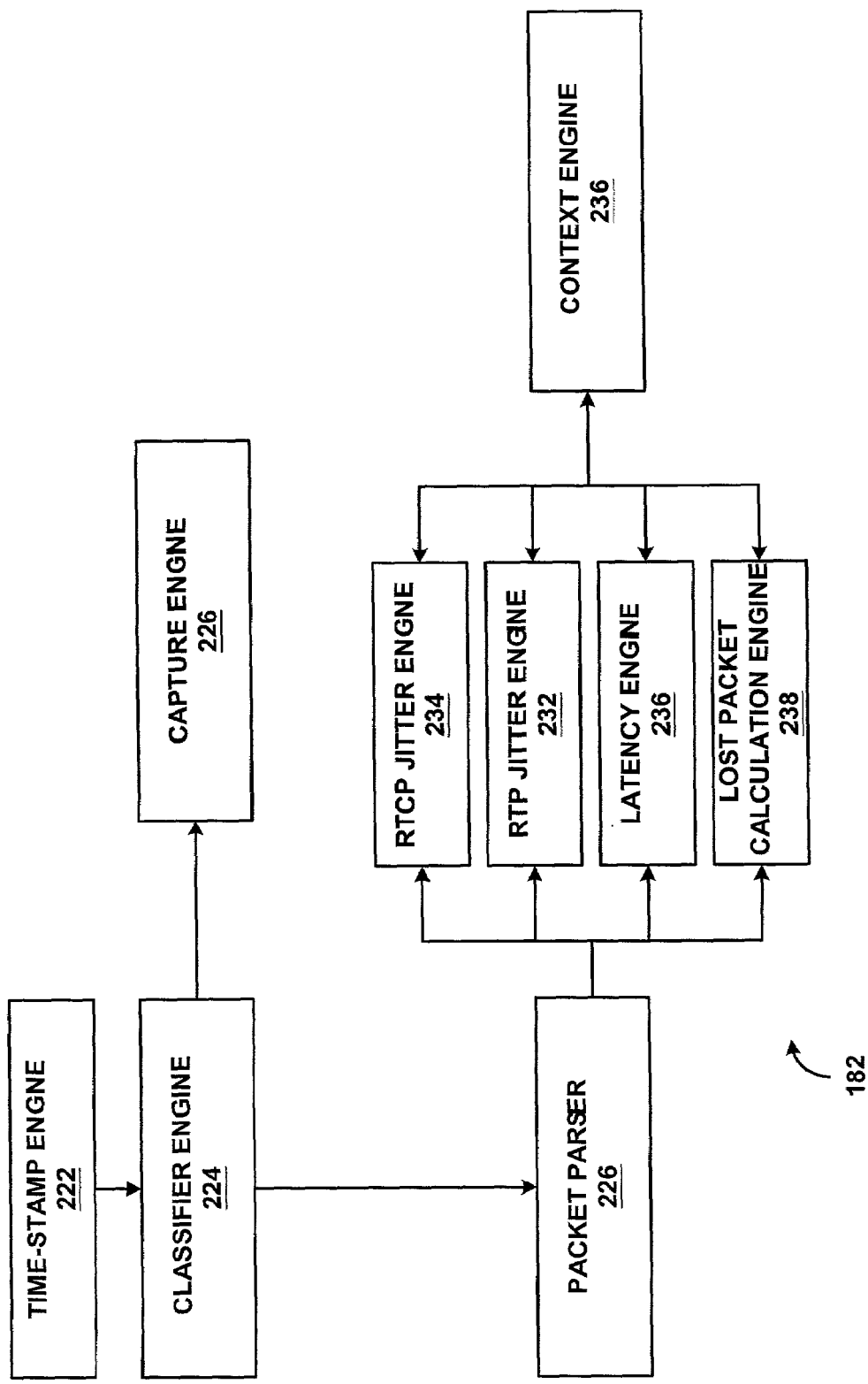
FIG. 5 is a block diagram that further illustrates a field programmable gate array located within the media router of FIG. 4.

As shown by FIG. 4, two FPGAs 182, 184 are located within the media router 118. Each FPGA 182, 184 provides the media router 118 with statistic gathering capability, wherein jitter, latency and lost packets may be determined. FIG. 5 is a block diagram that further illustrates an FPGA 182, 184.

Host Processor

The host processor 202 is connected to the FPGAs 182, 184 via the local link 154 and is capable of receiving multimedia after statistic generation by the FPGAs 182, 184. The host processor 202 is capable of communicating with other portions of the media router 118 via the local link 154 to assist in initialization. Since, by definition, network processors do not store functional code to be executed by a network processor, the host processor 202 retrieves the functional code and delivers the code to the network processor 162, 164, wherein the functional code is preferably stored within a storage element 203. As is known in the art, the functional code defines the functions to be performed by the network processor 162, 164.

The host processor 202 provides detection and correction of upstream and downstream failures in the transmission of RTP multimedia packets, while also providing multimedia flow quality measurement services. Methods used by the host processor 202 to detect and correct upstream and downstream failures in the transmission of RTP multimedia packets include, but are not limited to, the use of link failures and external management events. The multimedia flow quality measurement services provided by the host processor 202 are provided on a per flow basis, wherein an RTP multimedia flow is defined by a source IP address, a destination IP address, a source port, and/or a destination port. Quality measurement services preferably comprise maintaining current statistics for the RTP multimedia flow within the network processor 162, 164, as well as aggregate and min/max statistics for the RTP multimedia flow where applicable.

Examples of statistics that may be collected by the host processor 202 include latency, jitter and packet loss for a pre-defined window of time, wherein these statistics have been previously measured by the FPGAs 182, 184 and are stored within an FPGA memory 183, 185. It should also be noted that the pre-defined window of time may be defined by the session router 116 and/or the media router 118. The host processor 202 is also capable of configuring the policing and management policies of the traffic manager, and polling statistics gathered by the network processor that are not provided by the FPGA 182, 184.

A content addressable memory (CAM) 212, or external search engine, is located within the media router 118 and communicates within the media router 118, preferably via a dedicated external search memory interface located within the network processor 162, 164. The CAM 212 stores translations or bindings previously determined by "open/bin" requests for fast access by the network processor 162, 164. Open/bind requests are discussed in detail within the '304 patent application. An example of an external search engine is manufactured by Netlogic Microsystems, Inc, of Mountain View, Calif.

Field Programmable Gate Arrays

Having discussed the media router 118 and portions therein, the following description of FIG. 5, which further illustrates an FPGA 182, 184, provides further discussion of the statistics generation portion of the media router 118. It should be noted that statistics gathering performed by a media router 118 comprising the present FPGAs 182, 184 performs faster than the media router 118 would if statistics gathering were performed via software since use of software is processor intensive.

Referring to FIG. 5, when an RTP multimedia packet is received by the FPGA 182, 184 the packet is time-stamped by a time-stamp engine 222. The time-stamp engine 222 is a running clock that is capable of assigning an arrival time to a received RTP multimedia packet before the packet is transmitted further within the FPGA 182, 184. The arrival time is used by the FPGA 182, 184 to determine actual jitter and latency times as is explained in detail below, since a reference time is not provided within the header of RTP multimedia packets.

The FPGA 182, 184, comprises a classifier engine 224 that receives the RTP multimedia packet and determines if the packet is to be saved by observing the user defined field 145 of the RTP multimedia packet. Specifically, the FPGA 182, 184 observes the capture bit 147 of the RTP multimedia packet header 140 to determine whether to copy the RTP multimedia packet.

If the received RTP multimedia packet is to be saved, the classifier engine 224 transmits the packet to a capture engine 226. If the capture bit of the received multimedia packet header 140 is set, the capture engine 226 observes the copy bit of the RTP multimedia packet header 140 to determine whether to copy either the entire multimedia packet or just the header of the multimedia packet. If the capture engine 226 copies the entire multimedia packet, the packet is transmitted to the storage element 203, or another storage device that is accessible by the host processor 202, for retrieving the multimedia packets or captured headers.

Preferably, if either a copy of the received multimedia packet is being transmitted to the storage element 203, or if the multimedia packet is not to be copied, the received multimedia packet is transmitted to a packet parser 228. While the multimedia packet is sent to the packet parser 228, an internal signal is sent to initiate a context engine 236. The context engine 236 then utilizes the flow identification field 149 of the Vix-V3 header 144, to perform a lookup of information needed by the calculation engines located within the FPGA 182, 184, after which the information is transmitted to its respective calculation engine. The information is preferably located within the FPGA memory 183, 185 that is connected to the FPGA 182, thereby minimizing interaction with other portions of the media router 118, resulting is faster statistic gathering.

Information required by each calculation engine is preferably hardwired, thereby predefining required information without the use of software. As is shown below, calculation engines located within the FPGA 182, 184 include a RTCP jitter engine 234, a real-time transport protocol (RTP) jitter engine 232, a latency engine 236 and a lost packet calculation engine 238. The following provides an example of information required for each respective calculation engine.

In accordance with the preferred embodiment of the invention, the latency engine 236 requires the delay since last send report (DLSR); a network timing protocol (NTP) time stamp that is located within the RTCP header 143 (FIG. 3); and the time since the last send report (LSR). The RTCP jitter engine 234 requires an RTCP jitter value that is defined by the RTCP header 143 (FIG. 3). The lost packer calculation engine 238 requires a sequence number from the RTP header 142 (FIG. 3). Alternatively, the RTP jitter engine 232 does not require information from the FPGA engine 183, 185 (FIG. 4).

Calculation of jitter, latency and lost packets requires stored data from the FPGA memory 183, 185, that is retrieved by the context engine 238, and real time data received from a received multimedia packet. The packet parser 226 provides the real-time data to a requesting calculation engine for comparison purposes in deriving accurate measurement of jitter, latency, and/or lost packets. The packet parser 226 also identifies whether the received multimedia packet is an RTP packet or an RTCP packet by utilizing the classification identification 146 (FIG. 3) portion of the header 140 (FIG. 3). If the received multimedia packet is an RTP packet, the packet parser 226 isolates necessary real-time data from the multimedia packet and transmits the data to the RTP jitter engine 232. Alternatively, if the received multimedia packet is an RTCP packet, the packet parser 226 isolates necessary real-time data from the multimedia packet and transmits the data to the RTCP jitter engine 234.

Jitter is a measurement of the variation of a gap between packets on a flow. An alternative definition is that jitter is the variance in latency for an RTP multimedia packet flow. The RTP jitter engine 232 measures jitter for an RTP multimedia packet flow as it transits the media router 118. When an RTP multimedia packet reaches the RTP jitter engine 232, a timer is started that runs until the next RTP multimedia packet for that multimedia flow arrives. The time gap between multimedia packet receipt is referred to as the interpacket gap. The deviation of two interpacket gaps determines the jitter value. The deviation is added to an aggregate of deviations to maintain a "mean" jitter value. Alternatively, an RTCP multimedia packet comprises a jitter value within the RTCP header 144 (FIG. 3). Therefore, when an RTCP multimedia packet is received by the RTCP jitter engine 234, the RTCP jitter engine 234 parses the RTCP header and removes the jitter value. It should be noted that, since jitter calculation is performed in hardware, specifically, by either the RTP jitter engine 232 or the RTCP jitter engine 234, calculation of jitter is not processor intensive on the media router 118.

While the portions of the multimedia packet are transmitted to the RTCP jitter engine 234 and the RTP jitter engine 232, the packet parcer 226 also isolates necessary real-time data from the RTCP multimedia packet and transmits the data to the latency engine 236. The latency engine 236 calculates latency in RTCP multimedia packet transmission from the media router 118 to an endpoint. Presumably, the endpoint is a means of communication such as, but not limited to, an SIP phone. The subject of communication between the media router 118 and the endpoint is a test packet. The endpoint receiving the transmitted test packet compares when the test packet was received by the endpoint to when the test packet was transmitted by the media router 118, thereby determining a round trip time. The round trip time is then cut in half to approximate the one-way time, which is the latency in multimedia packet transmission.

It should be noted that rather than using a proprietary way to perform packet looping, RTCP packet format can be used. RTCP packet format allows extraction of a timestamp of the sender (from a send report) and placing of the timestamp into the looped test packet (in a receive report), as well as an estimate of how long it took to loop the test packet.

While the RTP multimedia packet is transmitted to the RTP jitter engine 232, the RTP multimedia packet is also transmitted to the lost packet calculation engine 238. Dropped packet processing, otherwise referred to as lost packet processing, may be accomplished on a multimedia packet flow by performing the following steps. The lost packet calculation engine 238 increments a counter located therein when the lost packet calculation engine 238 receives a sequence number from the packet parser 228 that is greater than a maximum sequence number stored in the FPGA memory 183, 185. The lost packet calculation engine 238 increments the counter by the difference between the maximum and received sequence numbers. When the lost packet calculation engine 238 receives a sequence number that is lower that the maximum sequence number stored in the FPGA memory 183, 185, the lost packet calculation engine 238 decrements the counter by one. If the sequence number received from the packet header 140 (FIG. 3) is defined as 'too-far' away from the maximum sequence number, as predefined by the host processor 202, the lost packet calculation engine 238 does not include the received sequence number in the decrement/increment calculation, since the sequence number is perceived to be too late. The counter number that the lost packet calculation engine 238 calculates represents the number of lost packets.

The FPGA 182, 184 also comprises a host interface 232 for allowing transmission of the captured multimedia packets to the host processor 202 as well as allowing the host to access the harvested statistics and clear any counters that have been accumulating. It should be noted that the FPGA 182, 184 is preferably provided in a pipeline format so that multimedia packets may be continuously received and analyzed by the FPGA 182, 184 during each clock edge.

It should be noted that, in accordance with alternate embodiments of the invention, more or fewer network processors 162, 164, 166, 168 may be connected to the traffic manager 118, and that more or fewer ports may be located within the traffic manager 172. In addition, more, or fewer FPGAs 182, 184 may be located within the media router 118.

It should be emphasized that the above-described embodiments of the present invention, particularly, any "preferred" embodiments, are merely possible examples of implemen- The following is claimed:

1. A system for providing statistics gathering within a multimedia packet network, comprising:
   At least one network processor configured to convert received multimedia packets into multiple length cells by adding a header to said received multimedia packet, wherein said header comprises a user defined field and a flow identification field;
   a traffic manager configured to measure and enforce multimedia flow rates, further configured to examine a copy field contained within the user defined field of the received multimedia packets to determine whether to copy the received multimedia packets to the at least one network processor;
   a host processor configured to perform multimedia flow quality measurement services on a per flow basis, wherein said multimedia flow quality measurement services comprise maintaining current statistics for multimedia flows within said network processor including aggregate and minimum/maximum statistics for said multimedia flow; and
   at least one field programmable gate array (FPGA) configured to copy a received multimedia packet or a portion of said received multimedia packet, and to utilize said copy of said received multimedia packet, or said copy of said portion of said received multimedia packet, to perform said statistics gathering via use of a series of calculation engines.

2. The system of claim 1, wherein said traffic manager utilizes said flow identification field to determined whether to transmit said received multimedia packet to said network processor or to said FPGA.

3. The system of claim 1, wherein said traffic manager, said FPGA, and said network processor utilize said flow identification field and user defined field to identify a received multimedia packet for storage of said statistics in accordance with a specific identified multimedia flow.

4. The system of claim 1, wherein one of the series of calculation engines comprises a latency calculation engine
   configured to transmit a test packet to an endpoint connected to said system; said endpoint comparing when said test packet is received by said endpoint to when said test packet was transmitted by said system, to determine a round trip time; and
   configured to divide said round trip time by two to determine said latency in multimedia packet transmission.

5. The system of claim 1, wherein said received multimedia packet further comprises a real-time transport protocol (RTP) packet header having a sequence number stored therein, and wherein said statistics gathering comprises a lost packet calculation engine
   configured to increment a counter if said lost packet calculation engine receives said sequence number and said sequence number is greater than a stored maximum sequence number, wherein said incrementing is by a difference between said maximum and said received sequence numbers; and
   configured to decrement said counter by one if said received sequence number is lower than said stored maximum sequence number,
   wherein the value of said counter is the number of lost packets.

6. The system of claim 1, wherein said received multimedia packet further comprises a real-time transport control protocol (RTCP) packet header having a jitter value therein, and wherein said statistics gathering comprises an RTCP jitter engine configured to determine RTCP jitter, said RTCP jitter engine configured to determine RTCP jitter by parsing said RTCP packet header and removing an RTCP jitter value.

7. The system of claim 1, wherein said received multimedia packet is a real-time transport protocol (RTP) jitter engine and wherein said statistics gathering comprises an RTP jitter engine configured to determine an RTP jitter value, said RTP jitter engine
   configured to start a timer when a first RTP multimedia packet is received by said RTP jitter engine;
   configured to stop said timer when a second RTP multimedia packet is received by said RTP jitter engine, wherein said first and said second RTP multimedia packets are from the same RTP multimedia flow, and wherein a time gap between arrival of said first RTP multimedia packet and said second multimedia packet is referred to as an interpacket gap; and
   configured to determine a deviation between two interpacket gaps to derive said RTP jitter value.

8. The system of claim 1, wherein said traffic manager measuring and enforcing multimedia flow rates is performed by said traffic manager enforcing predefined maximum data transmission rates by either dropping multimedia packets or marking said multimedia packets as eligible for discarding if said multimedia packets are outside of a predefined bandwidth allocated for multimedia packet flow.

9. The system of claim 1, wherein said header is a Vix-V3 header.

10. A system for providing statistics gathering within a multimedia packet network, comprising:
    means for providing a received multimedia packet with an arrival time;
    means for converting received multimedia packets into multiple length cells by adding a header to said received multimedia packet, wherein said header comprises a user defined field and a flow identification field;
    means for measuring and enforcing multimedia flow rates, further configured to examine a copy field contained within the user defined field of the received multimedia packets to determine whether to copy the received multimedia packets to the converting means;
    means for performing multimedia flow quality measurement services on a per flow basis, wherein said multimedia flow quality measurement services comprise maintaining current statistics for multimedia flows within the converting means including aggregate and minimum/maximum statistics for said multimedia flow;
    at least one field programmable gate array (FPGA) configured to copy the received multimedia packet based on a copy field contained within the user defined field of the received multimedia packet, or a portion of said received multimedia packet, and to utilize said copy of said received multimedia packet, or said copy of said portion of said received multimedia packet to perform statistics gathering based upon said received multimedia packet via use of a series of calculation engines, means for determining information from said received multimedia packet to be transmitted to said FPGA; and means for transmitting said determined information to said FPGA.

11. The system of claim 10, wherein said statistics include latency in multimedia packet transmission, lost packets, real-time packet jitter and real-time control packet jitter.

12. The system of claim 10, wherein said FPGA is further configured to gather latency information in multimedia packet transmission, said FPGA further comprising:

means for transmitting a test packet to an endpoint, said endpoint comparing when said test packet is received by said endpoint to when said test packet was transmitted, thereby determining a round trip time; and means for dividing said round trip time by two to determine said latency in multimedia packet transmission.

13. The system of claim 10, wherein said FPGA is further configured to gather real-time transport protocol (RTP) packet jitter, said FPGA further comprising:

means for starting a timer when a first RTP multimedia packet is received by said means for gathering RTP packet jitter;

means for stopping said timer when a second RTP multimedia packet is received by said means for gathering RTP packet jitter, wherein said first and said second RTP multimedia packets are from the same RTP multimedia flow, and wherein a time gap between arrival of said first RTP multimedia packet and said second multimedia packet is referred to as an interpacket gap; and means for determining a deviation between two interpacket gaps to derive said RTP packet jitter.

14. The system of claim 10, wherein said received multimedia packet further comprises a real-time transport control protocol (RTCP) packet header having a jitter value therein, and wherein said FPGA is further configured to gather RTCP packet jitter by parsing said RTCP packet header and removing an RTCP packet jitter value.

15. The system of claim 10, wherein said received multimedia packet further comprises a real-time transport protocol (RTP) packet header having a sequence number stored therein, and wherein said FPGA is further configured to:

means for incrementing a counter if a means for calculating lost packets receives said sequence number and said sequence number is greater than a stored maximum sequence number, wherein said incrementing is by a difference between said maximum and said received sequence numbers; and means for decrementing said counter by one if said received sequence number is lower than said stored maximum sequence number, wherein the value of said counter is the number of lost packets.

* * * * *